United States Patent
Yin et al.

(10) Patent No.: US 10,158,542 B2
(45) Date of Patent: Dec. 18, 2018

(54) DEVICE-MANAGING METHOD, APPARATUS, AND PROGRAM PRODUCT

(71) Applicant: Lenovo (Beijing) Limited, Beijing (CN)

(72) Inventors: Ping Yin, Beijing (CN); Xiaoyu Zhou, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 15/464,030

(22) Filed: Mar. 20, 2017

(65) Prior Publication Data
US 2017/0272340 A1 Sep. 21, 2017

(30) Foreign Application Priority Data
Mar. 18, 2016 (CN) .......................... 2016 1 0159259

(51) Int. Cl.
*H04L 12/26* (2006.01)

(52) U.S. Cl.
CPC .......... *H04L 43/0817* (2013.01); *H04L 43/04* (2013.01); *H04L 43/0823* (2013.01)

(58) Field of Classification Search
CPC .................. H04L 43/0817; H04L 43/04; H04L 12/2803–12/2838; H04L 2012/284–2012/285
See application file for complete search history.

(56) References Cited

U.S. PATENT DOCUMENTS

| | | | | |
|---|---|---|---|---|
| 6,434,626 B1 * | 8/2002 | Prakash | .............. | G06F 11/3006 60/796 |
| 6,892,317 B1 * | 5/2005 | Sampath | ................. | G06F 11/25 714/4.3 |
| 2005/0060364 A1 * | 3/2005 | Kushwaha | .......... | H04L 41/5009 709/200 |
| 2008/0300572 A1 * | 12/2008 | Rankers | ............. | A61B 5/14532 604/504 |
| 2013/0203359 A1 * | 8/2013 | Seiler | ........................ | H04Q 9/00 455/67.11 |
| 2014/0118121 A1 * | 5/2014 | Cheung | .................. | G08C 19/00 340/12.22 |
| 2015/0134727 A1 * | 5/2015 | Lee | ........................ | H04L 67/025 709/203 |
| 2015/0236895 A1 * | 8/2015 | Kay | ....................... | H04L 43/045 709/224 |

FOREIGN PATENT DOCUMENTS

WO WO-2017005341 A1 * 1/2017 ........ G06F 17/30687

* cited by examiner

*Primary Examiner* — Rina C Pancholi
(74) *Attorney, Agent, or Firm* — Kunzler, PC (57) ABSTRACT

A method is disclosed. The method may include a method for management of an electronic device. The method may include acquiring operation data of an electronic device. The method may include determining, based on the operation data of the electronic device whether to send a data-acquiring command to the electronic device. The method may include sending a data-acquiring command to the electronic device. The method may include receiving, from the electronic device, response data generated by the electronic device in response to the data-acquiring command. An apparatus and program product are also disclosed.

14 Claims, 3 Drawing Sheets

DEVICE-MANAGING METHOD, APPARATUS, AND PROGRAM PRODUCT

FIELD

The present disclosure relates to the field of data processing, and more specifically, relates to a device-managing method, apparatus, and program product.

BACKGROUND

When managing electronic devices, it may be useful for a management center on the back end to know how the electronic devices operate. For example, when managing a large chain of stores, the management center may verify the display status of displaying devices (such as computers, televisions, or the like) in each store to determine whether the display in each store is functioning properly. Where data cannot be collected or uploaded due to, for example, a powered-off computer or network or device failure, the management center may designate the monitored device as operating abnormally. However, in the process of deciding whether the result is due to store-related causes, it may not be advantageous for the management center to collect data from the device because of a possible delay in the evaluation of the device.

SUMMARY

In one embodiment, a method is disclosed. The method may include acquiring operation data of an electronic device. The method may include determining, based on the operation data of the electronic device whether to send a data-acquiring command to the electronic device. The method may include sending a data-acquiring command to the electronic device. The method may include receiving, from the electronic device, response data generated by the electronic device in response to the data-acquiring command.

In one embodiment, an apparatus is disclosed. The apparatus may include a processor. The method may include a memory storing code executable by the processor. The executable code may include code that acquires operation data of an electronic device. The executable code may include code that determines, based on the operation data of the electronic device, whether to send a data-acquiring command to the electronic device. The executable code may include code that sends the data-acquiring command to the electronic device. The executable code may include code that receives, from the electronic device, response data generated by the electronic device in response to the data-acquiring command.

In one embodiment, a program product is disclosed. The program product may include a computer-readable storage medium that stores code executable by a processor. The executable code may include code to perform acquiring operation data of an electronic device. The executable code may include code to perform determining, based on the operation data of the electronic device whether to send a data-acquiring command to the electronic device. The executable code may include code to perform sending a data-acquiring command to the electronic device. The executable code may include code to perform receiving, from the electronic device, response data generated by the electronic device in response to the data-acquiring command.

BRIEF DESCRIPTION OF THE DRAWINGS

To describe the technical solutions according to the embodiments of the present disclosure, accompanying drawings used for describing the embodiments are hereinafter briefly introduced. It is apparent that the accompanying drawings hereinafter are only intended to illustrate some embodiments of the present disclosure.

DETAILED DESCRIPTION

Figure 1:
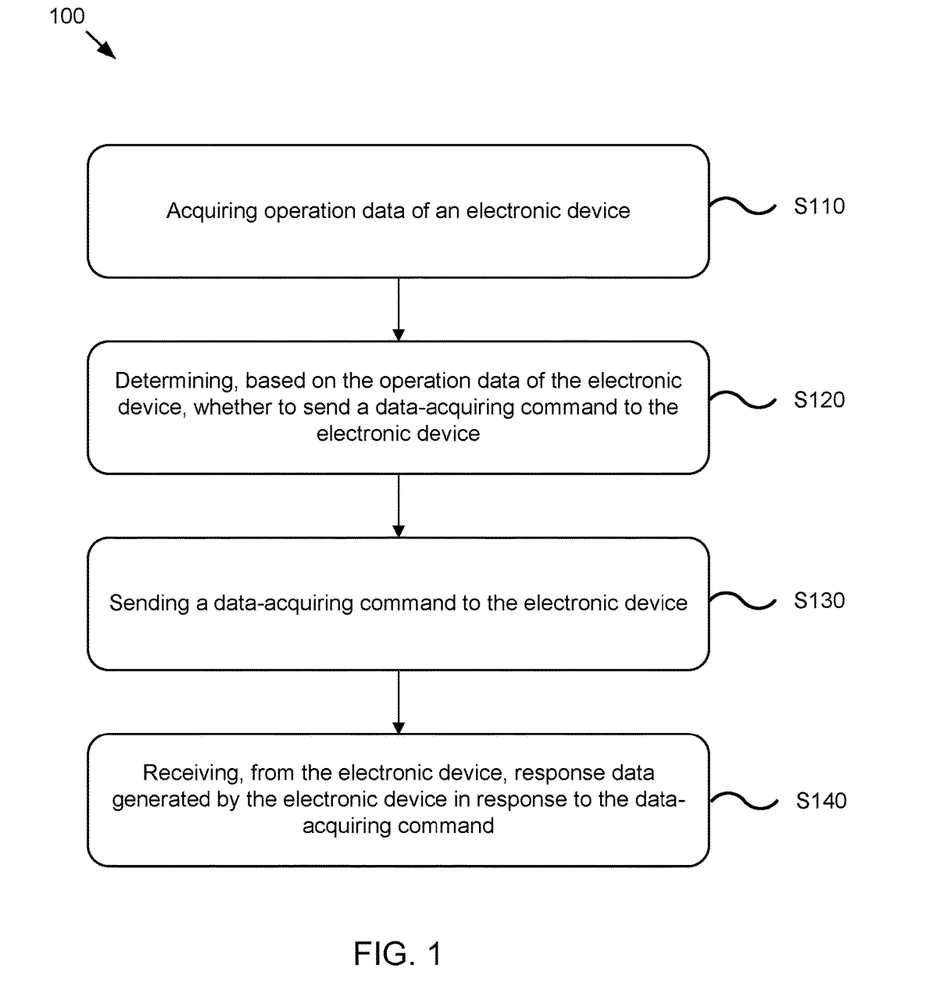
FIG. 1 is a flow chart diagram illustrating one embodiment of a managing method.

FIG. 1 depicts one embodiment of a method 100. The method 100 may include a managing method that may manage one or more electronic devices. An electronic device may include a computer, such as a laptop computer, desktop computer, server, or the like. An electronic device may include a display device, such as computer monitor, television, projector, or the like. In some embodiments, the electronic device may include another type of device capable of being managed, for example, by a back end server or the like.

In one embodiment, the method 100 may be implemented, used, or the like in the scenario of managing a large chain of stores. The method 100 may be implemented in a management center. The management center may include one or more servers that implement the method 100. The server may communicate with the one or more electronic devices via a data network. The data network may include a digital communication network that transmits digital communications. For example, the data network may include a Wi-Fi network, a BLUETOOTH network, a wide area network ("WAN"), a storage area network ("SAN"), a local area network ("LAN"), an optical fiber network, the Internet, or other digital communication network. While examples herein discuss the method 100 in relation to a server the method 100 is not limited thereto.

In one embodiment, the method 100 may include acquiring S110 operation data of an electronic device. In one embodiment, the operation data may include log information of the electronic device. Log information may include the log information automatically recorded during operation of the electronic device. In some embodiments, in order to reduce the amount of data to be delivered, the log information may only include exceptional log information of the electronic device. In one embodiment, exceptional log information may include log information that is recorded during improper operation of the electronic device. For example, improper operation log information may include log information due to errors, faults, illegal operations, exceptions, unexpected operations, corrupted data, or the like. In some embodiments, exceptional log information may include non-routine log information. Exceptional log information may include log information generated by the operating system ("OS"), software installed on the electronic device, or hardware that the generating hardware or software marks as exceptional, unusual, or the like.

In some embodiments, acquiring S110 operation data of the electronic device may include acquiring metadata associated with the electronic device. The metadata may include metadata about the model of electronic device on a network. The model of the electronic device may be stored in advance in a device that may implement the method 100. For example, a server may include metadata indicating its model, version number, OS, or the like. The electronic device may request one or more pieces of metadata from the server. The metadata may be stored on the electronic device or may be acquired from another source, such as a database.

For example, in one embodiment, web crawling may extract related web pages, automatically analyze metadata from the crawled data, and extract data related to software and hardware concerning the network and systems on the network. Those skilled in the art should understand that the web crawling mentioned above is only illustrative, and the method 100 may acquire metadata in other manners. In some embodiments, each of the pieces of metadata acquired may be stored in association with its data source. The data source may be marked automatically or manually.

As seen above, in some embodiments, the acquiring S110 the operation data may include acquiring the operation data from the electronic device. For example, the electronic device may generate log information and send to a server. In one embodiment, the acquiring S110 the operation data may include acquiring the operation data from a source other than the electronic device. For example, as described above, a web crawler may acquiring operation data about the electronic device from web pages. Acquiring S110 the operation data of the electronic device from sources other than the electronic device may include other manners or sources.

In one embodiment, the method 100 may include determining S120, based on the operation data of the electronic device, whether to send a data-acquiring command to the electronic device.

In some embodiments, operation data may be generated based on the log information, the metadata, or other operation data. For example, metadata of an electronic device may be extracted in various manners of information analysis, such as semantic analysis, association analysis, or the like to generate the device metadata of the electronic device. The device metadata may include, for example, data associated with various aspects of the device, such as network interface controller ("NIC") connection, system stability, driver status, or the like. In some embodiments, the device metadata may be expressed in the form of one or more entries. An entry may include various values. For example, an NIC connection entry may include a value of "1" indicating "good connection" and a value of "0" indicating "poor connection."

In one embodiment, the method 100 may include determining, based on the operation data of the electronic device, whether to send a data-acquiring command to the electronic device. For example, the server may store one or more tables that express the correspondence between device operation data and command transmission status (e.g., "sent" or "not sent"). The table may include multiple items, each of which may indicate the correspondence between various combinations of device metadata entries and command transmission status. For example, one item in the table may include "poor NIC connection," "poor system stability," "outdated driver," or the like" that may correspond to "sending a data-acquiring command."

In one embodiment, in response to determining, according to the table described above, to send a data-acquiring command to the electronic device, the data-acquiring command may be sent to the electronic device.

In one embodiment, the method 100 may include determining whether to send the data-acquiring command to the electronic device based, at least in part, on a scoring mechanism. The determining S120, based on the operation data of the electronic device whether to send the data-acquiring command to the electronic device may include calculating a score for the electronic device based on the operation data of the electronic device. In one embodiment, a weight may be preset for each entry of the device metadata. The score of an electronic device may be calculated based on the value and corresponding weight of each of the entries. In some embodiments, in the case where both log information and metadata are acquired, different weights may also be set for two kinds of data in view of the difference between the different types of data acquired to obtain a more accurate score. For example, the weight of log information may include a larger weight than that of metadata. In some embodiments, the weight of the metadata may further be adjusted in based on the credibility of the data source of the metadata to obtain a more accurate score. In one embodiment, calculating the score for an electronic device may include calculating a score for each of multiple electronic devices.

In some embodiments, in response to obtaining the calculated score, the determining S120, based on the operation data of the electronic device whether to send the data-acquiring command to the electronic device may include, determining, based on the score, whether to send the data-acquiring command to the electronic device. For example, the method 100 may include determining to send a data-acquiring command to the electronic device in response to the score being less than or larger than a score threshold. The score threshold may include a predetermined score threshold.

In one embodiment, multiple electronic devices may be sequenced based on the score for the corresponding electronic device and the method may include determining to send the data-acquiring command to a portion of the electronic devices based on the sequence. For example, the method 100 may include determining to send a data-acquiring command to a portion of electronic devices at the beginning of the sequence, end of the sequence, middle of the sequence, or the like. The portion of electronic devices that are sent the data-acquiring command may include a predetermined number, sequence, ratio, percentage, or the like.

In some embodiments, managing multiple electronic devices may include selecting a single recipient electronic device. A single recipient device may be selected to reduce the number of data-acquiring commands to be sent or the amount of data to be subsequently transmitted. For example, in one embodiment, in response to determining multiple electronic devices that may be recipients of a data-acquiring command in a manner mentioned above a single target electronic device, to which the command may be sent, may be further selected, in one or more various manners, from the candidates to which the command may be sent.

For example, in one embodiment, one or more factors may be taken into consideration to determine to which electronic device(s) to send the data-acquiring command. A factor may include data transmission between the electronic device and the server, device metadata, or the like. For example, historical data or current data may be transmitted properly between the electronic device and the server, and in response to this determination, a data-acquiring command may not be sent to the electronic device.

In one embodiment, a finer granularity of analysis may be performed on entries of the device log information or metadata. For example, the analysis may include analysis of the series and model of an electronic device instead of the brand. Thus, in some embodiments, some log information or metadata about certain electronic devices of a specific brand may always include a certain value. The device log information or metadata of a specific series or a specific model from a specific brand of electronic devices may include a different value. In response to this analysis, a data-acquiring command may not be sent to the specific series or specific model of electronic devices.

In one embodiment, for example, device metadata may be defined as E=<D, C, Source, Score>. D may indicate a set of one or more virtual devices. The one or more virtual devices may undergo attribute filtering. For example, the one or more virtual devices may include devices with integrated a NIC or a certain operating systems. C may indicate metadata. For example, the metadata may include data about a network connection issue, unstable operating system, drive exception, or the like. Source may indicate the data source from which the data is extracted. Score may indicate the value related to device management determined as described herein. The above is only one example of an electronic device metadata. The device metadata may be defined by those skilled in the art in another suitable manner.

In some embodiments, a data about an electronic device may be defined as d={spec, network, scenario, status}. Spec may indicate basic device information. For example, basic device data may include series, model, stock keeping unit ("SKU"), hardware or software information, or the like. Network may indicate data about one or more networks the device connects to. For example, network data may include media access control ("MAC") address of the device, one or more Internet protocol ("IP") addresses, or the like. Scenario may include data about the scenario, situation, context, or the like where the device is utilized for example, in the store management case as mentioned above, the scenario data may include data about how a store is organized. Status may indicate whether the electronic device supports automatic information collection. The above is only an example of how data about an electronic device may be stored. The device may be defined by those skilled in the art in another suitable manner.

In one embodiment, for example, the data-acquiring command may be defined as c={stores, rules, timeframe, type}. Stores may indicate a corresponding electronic device under management. For example, in the store management case as mentioned above, stores may indicate store code information. Rules may indicate one or more rules for data collection. A rule may be defined according to device type, network condition, or other constraints. Timeframe may indicate a time interval for data collection. For example, timeframe may include a time window determined on the management side. Type may indicate a type of data collection. For example, types of data collection may include manual, automatic, optional, mandatory, or the like. The above is only an example and the data-acquiring command may be generated by those skilled in the art in another suitable manner.

In some embodiments, the method 100 may include sending S130 a data-acquiring command to the electronic device. In one embodiment, the sending S130 the data-acquiring command may include sending the data-acquiring command to a portion of multiple electronic devices based on a sequence, such as the sequence calculated above. In some embodiments, sending S130 the data-acquiring command to the electronic device may include sending multiple data-acquiring commands to the same electronic device.

In one embodiment, the method 100 may include receiving S140, from the electronic device, response data generated by the electronic device in response to the data-acquiring command. In some embodiments, the response data may include operation data of the electronic device.

In one embodiment, routine communication between the electronic device and the server may be performed via a first communication link such as wired communication. For example, acquiring S110 operation data of the electronic device may include acquiring the operation data via the first communication link. In one embodiment, receiving S140, from the electronic device, response data generated by the electronic device in response to the data-acquiring command may include receiving the response data from the electronic device via a second communication link. The first communication link and second communication link may be different. For example, in response to communication between the electronic device and the server being normal, the response data may be received from the electronic device via the first communication link. In some embodiments, in response to one or more causes (e.g. network failure or the like), a communication error between the electronic device and the server may occur. The data may be received from the electronic device via a second communication link different from the first communication link. The first communication link may employ a different communication protocol, medium, manner, or the like from the second communication link. For example, in one embodiment, the first communication link may support wired communication and the second communication link may support wireless communication. For example, with the use of an external electronic device (such as a cellphone, a tablet computer, or the like), the electronic device may send response data wirelessly, to the external electronic device, and the external electronic device may forward the response data to the server.

In some embodiments, the response data may be generated by the electronic device based on the data-acquiring command. The command may include data related to the operation of the electronic device. For example, the electronic device may automatically extract local data that has been cached (for example, exceptional log information), or automatically start to record, save, or the like data corresponding to one or more parameters of the command. In one embodiment, to avoid errors, faults, or the like, the device may automatically access content information, and the content data may be defined in the data-acquiring command in the form of a rule. For example, the data may include screenshots. In some embodiments, the data may include time data or other device data. The time data may be used to implement time synchronization. Differential alignment may be performed by extracting machine clock information. The data may be indexed according to some items (such as time) to form a specific format of content, which may be saved locally in an electronic device or a specific storage location to form the response data.

In one embodiment, for example, the response data may be defined as a data collection model m={images, logs, data series, index}. Images may indicate data about images collected. Logs may indicate device log information. Data series may indicate calibration data of local time and network time. In some embodiments, local time and network time may include time values different from each other. Index may indicate index data about the content collected. The above is only an example. The response data may be formed by those skilled in the art in another suitable manner.

In one embodiment, in response to generating the response data, the electronic device may send the response data to the server. The electronic device may send the response data immediately or may waits for a triggering event. For example, a triggering event may include a certain time interval passing, a certain time being reached, receiving a command, signal, or the like. In response to triggering event occurring, the electronic device may send the response data to the server. In one embodiment, sending the response data may finish submission of information. In some embodiments, before submission, response data to be submitted may be shown to a user and allow the user to confirm or cancel the delivery of the response data.

In some embodiments, the method 100 may include receiving, from the electronic device, monitoring information of the electronic device. The method 100 may include verifying the response data based on the monitoring information. The method 100 may include determining, based on the verifying, whether to continue sending the data-acquiring command to the electronic device. The method 100 may include, in response to determining to continue to send the data-acquiring command to the electronic device, sending the data-acquiring command to the electronic device.

In one embodiment, data collected from one or more electronic devices may be relatively consistent with data already included in back end data. This may result in little usefulness of data collection from those devices. In one embodiment, to avoid wasteful data collection and improve efficiency, monitoring data may be received from the one or more electronic devices. The monitoring data may include, for example, daily operation data. The response data may be verified based on the monitoring data to determine whether to continue sending the data-acquiring command to the electronic device. In response to the difference between the response data and the monitoring data being within a preset allowance, a command for canceling data acquisition may be sent to the electronic device. In response to the cancellation, the electronic device may not continue sending response data. In one embodiment, in response to determining that the data-acquiring command should continue to be sent to the electronic device, the data-acquiring command may be sent to the electronic device. In one embodiment, in response to determining, based on the score as discussed above, whether a data-acquiring command should be sent, the server may adjust the score of the electronic device according to the verification result.

In on embodiment, resource utilization of the managing device, managed electronic device or devices, the network connecting the managing device and the managed electronic devices(s), may be improved. Pressure on the back end server may be alleviated, workload may decrease, and overall stability or work efficiency of the system may increase and may improve the function of the managing device, managed electronic device(s), or the network. In one embodiment, the method 100 may enable smart management of the one or more electronic devices and data collection. In the case where the electronic device(s) under management may operate improperly, the cause of improper operation may be analyzed intelligently, and the results of such analysis may help improve management efficiency and optimizing management reliability.

Figure 2:
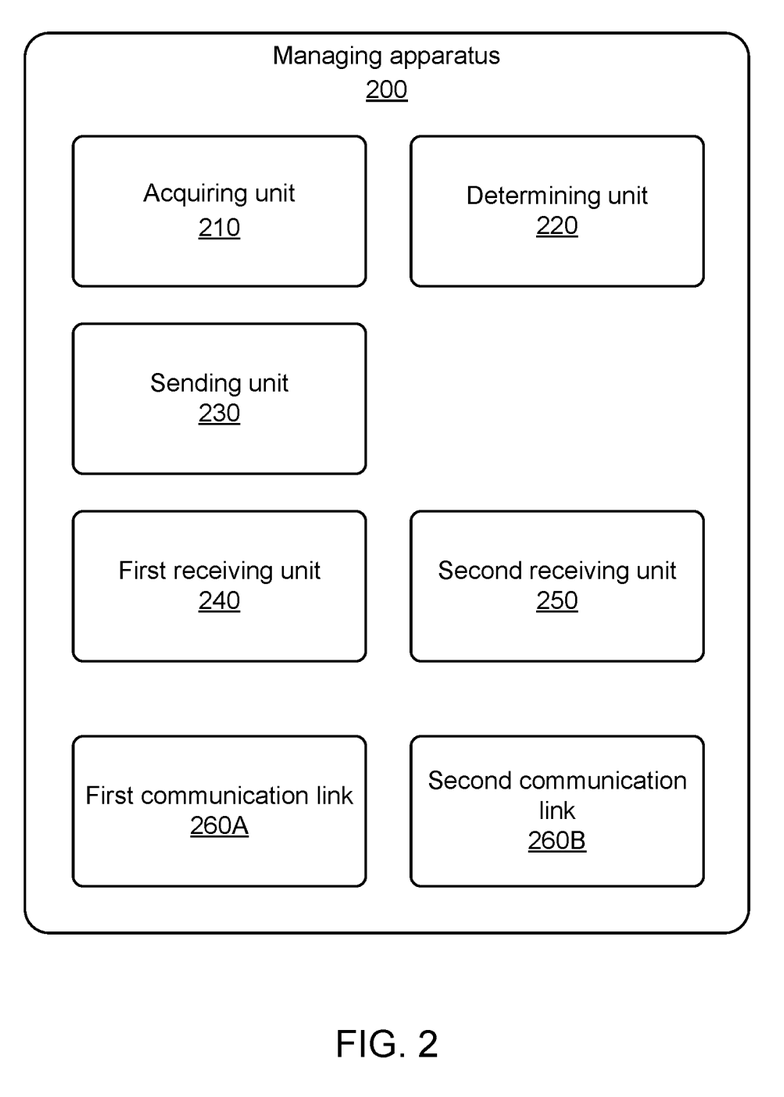
FIG. 2 is a schematic block diagram illustrating one embodiment of a managing apparatus.

FIG. 2 depicts one embodiment of a managing apparatus 200 according to one embodiment. As shown in FIG. 2, the managing apparatus 200 may include an acquiring unit 210. In one embodiment, the managing apparatus 200 may include a determining unit 220. IN some embodiments, the managing apparatus 200 may include a sending unit 230. In one embodiment, the managing apparatus 200 may include a first receiving unit 240.

In one embodiment, the acquiring unit 210 may acquire data from the electronic device. The data may include log information of an electronic device. The acquiring unit 210 may acquire metadata associated with the electronic device.

In some embodiments, the determining unit 220 may determine, based on the operation data of the electronic device, whether to send a data-acquiring command to the electronic device. The sending unit 230 may send the data-acquiring command to the electronic device. The sending unit 230 may send the data-acquiring command based, at least in part, on the acquired data from the electronic device or in response to the determination of the determining unit 220. In one embodiment, the first receiving unit 240 may receive response data generated by the electronic device based on the data-acquiring command. The first receiving unit 240 may receive the response data from the electronic device.

In one embodiment, the determining unit 220 may include a scoring unit. The scoring unit may calculate a score for the electronic device based on the operation data about the electronic device (e.g. the log information of the electronic device, metadata associated with the electronic device, or the like). In one embodiment, the determining unit 220 may include a first deciding unit. The first deciding unit may determine, based on the score, whether to send a data-acquiring command to the electronic device. The sending unit 230 may include a first command sending unit. The first command sending unit may, in response the determination that a data-acquiring command is to be sent to the electronic device, send the data-acquiring command to the electronic device.

In one embodiment, the determining unit 220 may include a second deciding unit. The second deciding unit may calculate a score corresponding to each of multiple electronic devices. The second deciding unit may determine a sequence the multiple electronic devices based on the corresponding score. In some embodiments, the sending unit 230 may send the data-acquiring command to a portion of the plurality of electronic devices based on the sequence.

In some embodiments, the managing apparatus 200 may include a first communication link 260A. As described above in relation to FIG. 1, a communication link may communicatively link the managing apparatus 200 and the electronic device. For example, a communication link may include a data network, such as the data network described above. In one embodiment, the communication link may include a network interface of the managing apparatus 200 or electronic device.

Data about the electronic device, such as log information, may be acquired from the electronic device via a first communication link 260A. The first receiving unit 240 may receive the data from the electronic device via a second communication link 260B. The second communication link 260B may be different from the first communication link 260A. For example, as described above, there may be a communication failure associated with the first communication link 260A. The communication failure may include at least a part of the data network being down or may include network interface failure. The managing apparatus 200 may detect the failure (for example, from an unresponsive electronic device over the first communication link 260A) and in response, use the second communication link 260B to acquire data, response data, monitoring data, or the like from the electronic device or send data, such as the data-acquiring command to the electronic device.

In one embodiment, the managing apparatus 200 may include a second receiving unit 250. The second receiving unit 250 may receive monitoring data. The second receiving unit 250 may receiving the monitoring data from the electronic device. In one embodiment, the second receiving unit 250 may receiving the data in response to the monitoring of the electronic device. In one embodiment, the managing apparatus 200 may include a second deciding unit. The second deciding unit may verify the response data based on the monitoring data. The second deciding unit may verify the response data to determine whether to continue sending the data-acquiring command to the electronic device. In some embodiments, the managing apparatus 200 may include a second command sending unit. The second command sending unit may, in response to the determination that the data-acquiring command is to continue to be sent to the electronic device, send the data-acquiring command to the electronic device. In some embodiments, the managing apparatus 200 may manage multiple electronic devices. Thus, in some embodiments, the above units may interact with one or more electronic devices. For example, the acquiring unit 210 may acquire data from one or more electronic devices. One or more other units described above may operate as described above in relation to one or more electronic devices.

As described above in relation to the method 100, resource utilization of the managing apparatus 200, managed electronic device or devices, the network connecting the managing apparatus 200 and the managed electronic devices(s), may be improved. Pressure on the back end server may be alleviated, workload may decrease, and overall stability or work efficiency of the system may increase and may improve the function of the managing apparatus 200, managed electronic device(s), or the network. These benefits may result from more efficient management of the monitored electronic device(s), from sending or receiving data to only certain electronic devices or to an electronic device under certain conditions.

Figure 3:
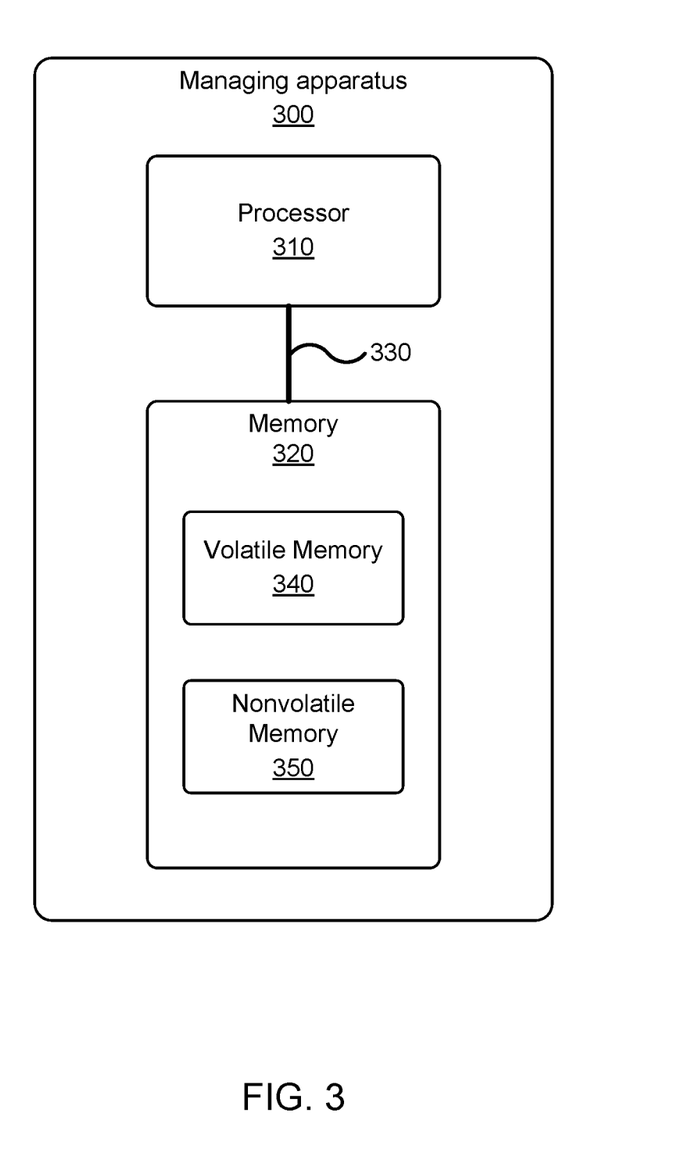
FIG. 3 is a schematic block diagram illustrating another embodiment of a managing apparatus.

FIG. 3 depicts one embodiment of a managing apparatus 300. The managing apparatus 300, according to an embodiment of the present disclosure, may include one or more processors 310. In one embodiment, the managing apparatus 300 may include a memory 320. These components may connect by a bus system 330 or connecting mechanisms in other forms. The components and structures of the managing apparatus 300 as shown in FIG. 3 are illustrative, rather than limiting. The managing apparatus 300, in some embodiments, may include other components or structures.

The processor 310 may include a central processing unit ("CPU") or a processing unit in other forms with a data processing capability or instruction executing capability. The processor 310 may control other components in the managing apparatus 300 to execute expected functions. In some embodiments, the processor 310 may include one or more processors, one or more cores, or the like.

The memory 320 may include one or more computer program products that may include various forms of computer-readable media. The computer-readable media may include storage media, such as volatile memory and/or nonvolatile memory. The volatile memory, for example, may include random access memory (RAM), cache memory (cache), or the like. The non-volatile memory, for example, may include a read only memory (ROM), a hard disk, a flash memory, or the like. One or more computer program instructions may be stored on the computer-readable storage medium. The processor 310 may run the program instructions to implement the functions of the managing method, such as the method 100, according to one or more embodiments of the present disclosure. In one embodiment, the computer-readable media may include a non-transitory media. In some embodiments, configuration and specific operations of various units of the managing apparatus 200 or 300 have been described in the method 100 described with reference to FIG. 1, and therefore, are not repeated herein.

According to some embodiments, a computer program product is provided. The computer program product may include computer-readable media (including computer-readable storage media or non-transitory computer-readable media) on which computer program instructions, such as executable code, may be stored. In response to the instructions being run by a computer, the computer program instructions may execute the method 100 described above or may perform the functions of the units described above in relation to FIG. 2. The computer program product may result in the same or similar advantages and benefits as the method 100 or the managing apparatus 200 or 300.

In the description herein, the terms "includes", "including" or another variation thereof are intended to cover a non-exclusive inclusion, such that a process, a method, an article, or a device that comprises a list of elements does not include only those elements, but may include other elements not expressly listed or inherent to such process, method, article, or device. An element defined by the phrase "includes a(n) . . . " does not, without more constraints, preclude the existence of additional identical elements in the process, method, article, or device that comprises the element.

Moreover, note that in the description, the expressions similar to "the first . . . unit", "the second . . . unit" are only for convenience of distinguishing in description, and do not mean that they must be implemented as two or more physically separated units. In fact, the unit may be implemented as a unit integrally and also implemented as multiple units as needed. Furthermore, the terms "first" and "second" do not necessarily indicate an order, sequence, or the like. The above-mentioned series of processing includes not only the processing performed according to time series in the sequence described herein, but also the processing performed in parallel or respectively rather than according to time series.

Those skilled in the art should understand from the description of the above embodiments that the present disclosure may be realized with the help of software, hardware, or a mixture of software and hardware. All or a part of the components of the present disclosure may be embodied in the form of a software product, which may be stored in the storage medium such as ROM/RAM, diskette, or optical disc, hard disk, universal serial bus ("USB") drive, or the like. The software product may include several instructions for one computer device (such as a personal computer, a server, a network device, or the like) to execute the embodiments of the present disclosure or execute one or more methods described by some parts of the embodiments.

In the embodiments of the present disclosure, a unit, module, or the like may be implemented by software for execution by various types of processors. For example, a processor may include the processor 310, described above. A processor may include multiple processors, multiple cores, or the like. A processor may include a specialty processor. A unit, module, or the like may include executable code. The executable code may include one or more physical or logical blocks of computer instructions, which may, for instance, be constructed as an object, procedure, or function. The executable code may not be physically located together, but may comprise separate instructions stored in different locations which, in response to being joined logically together, may include the unit, module, or the like, substantially achieve the stated purpose for the unit, module, or the like. The executable code may be stored in a memory, such as the memory 320 described above.

The unit, module, or the like may be implemented using hardware. Corresponding hardware circuits may achieve corresponding functions for the unit, module, or the like which may be implemented by the software. The hardware circuit may include very large scale integration (VLSI) circuits, gate arrays, semiconductors (such as logic chips, transistors), or other discrete elements. A unit, module, or the like may be implemented in programmable hardware devices such as field programmable gate arrays, programmable array logic, programmable logic devices, or the like.

The present disclosure has been described above using examples to illustrate embodiments of the present disclosure. The above-mentioned description of the embodiments is may help to understand the present disclosure and the concepts thereof. Changes can be made and application range according to the concept of the present disclosure. Thus, the contents of the description should not be considered to limit the present disclosure.

What is claimed is:

1. A method comprising:
    acquiring operation data for a plurality of electronic devices;
    calculating a score for each of the plurality of electronic devices based on weighted values for the operation data;
    determining a sequence of the plurality of electronic devices based on the calculated score for each of the plurality of electronic devices in response to the calculated score for each of the plurality of electronic devices in response to the calculated score for each of the plurality of electronic devices satisfying a predetermined score threshold;
    sending a data-acquiring command to at least a portion of the plurality of electronic devices based on the sequence, the data-acquiring command defining types of content to be acquired from the at least a portion of the plurality of electronic devices; and
    receiving, from the at least a portion of the plurality of electronic devices in the sequence, response data generated by each of the at least a portion of the plurality of electronic devices in the sequence in response to the data-acquiring command.

2. The method of claim 1, wherein acquiring the operation data of the plurality of electronic devices comprises at least one of:
    acquiring log information associated with each of the plurality of electronic devices; and
    acquiring metadata associated with each of the plurality of electronic devices.

3. The method of claim 1, wherein:
    acquiring operation data of the plurality of electronic devices comprises acquiring the operation data from the plurality of electronic devices via a first communication link; and
    receiving, from the at least a portion of the plurality of electronic devices, response data generated by the at least a portion of the plurality of electronic devices in response to the data-acquiring command comprises receiving the response data from the at least a portion of the plurality of electronic devices via a second communication link, wherein the second communication link comprises a communication link different from the first communication link.

4. The method of claim 1, wherein the response data comprises operation data of the at least a portion of the plurality of electronic devices.

5. The method of claim 1, further comprising:
    receiving, from the plurality of electronic devices, monitoring information of the plurality of electronic devices;
    verifying the response data based on the monitoring information;
    determining, based on the verifying, whether to continue sending the data-acquiring command to the at least a portion of the plurality of electronic devices; and
    in response to determining to continue to send the data-acquiring command to the at least a portion of the plurality of electronic devices, sending the data-acquiring command to the at least a portion of the plurality of electronic devices.

6. An apparatus comprising:
    a processor; and
    a memory storing code executable by the processor, the code comprising:
        code that acquires operation data for a plurality of electronic devices;
        code that calculates a score for each of the plurality of electronic devices based on weighted values for the operation data;
        code that determines a sequence of the plurality of electronic devices based on the calculated score for each of the plurality of electronic devices in response to the calculated score for each of the plurality of electronic devices satisfying a predetermined score threshold;
        code that sends a data-acquiring command to at least a portion of the plurality of electronic devices based on the sequence, the data-acquiring command defining types of content to be acquired from the at least a portion of the electronic device; and
        code that receives, from the at least a portion of the plurality of electronic devices in the sequence, response data generated by each of the at least a portion of the plurality of electronic devices in the sequence in response to the data-acquiring command.

7. The apparatus of claim 6, wherein the operation data comprises at least one of:
    log information associated with each of the plurality of electronic devices; and
    metadata associated with each of the plurality of electronic devices.

8. The apparatus of claim 6, wherein:
    the code that acquires the operation data of the plurality of electronic devices comprises code that acquires the operation data of the plurality of electronic devices from a first communication link; and
    the code that receives, from the at least a portion of the plurality of electronic devices, the response data generated by the at least a portion of the plurality of electronic devices in response to the data-acquiring command comprises code that receives the response data via a second communication link, wherein the second communication link comprises a communication link different from the first communication link.

9. The apparatus of claim 6, wherein the code executable by the processor further comprises:
    code that receives, from the plurality of electronic devices, monitoring information of the plurality of electronic devices;

code that verifies the response data based on the monitoring information; and code that determines, based on a result from the code that verifies the response data, whether to continue sending the data-acquiring command to the at least a portion of the plurality of electronic devices.

10. A program product comprising a non-transitory computer-readable storage medium that stores code executable by a processor, the executable code comprising code to perform:

acquiring operation data for a plurality of electronic device;

calculating a score for each of the plurality of electronic devices based on weighted values for the operation data;

determining a sequence of the plurality of electronic devices based on the calculated score for each of the plurality of electronic devices in response to the calculated score for each of the plurality of electronic devices satisfying a predetermined score threshold;

sending a data-acquiring command to at least a portion of the plurality of electronic devices based on the sequence, the data-acquiring command defining types of content to be acquired from the at least a portion of the plurality of electronic device; and receiving, from the at least a portion of the plurality of electronic devices in the sequence, response data generated by each of the at least a portion of the plurality of electronic devices in the sequence in response to the data-acquiring command.

11. The program product of claim 10, wherein the code to perform acquiring the operation data of the plurality of electronic devices comprises code to perform at least one of:

acquiring log information associated with each of the plurality of electronic devices; and acquiring metadata associated with each of the plurality of electronic devices.

12. The program product of claim 10, wherein:

the code to perform acquiring the operation data of the plurality of electronic devices comprises code to perform acquiring the operation data from the plurality of electronic devices via a first communication link; and the code to perform receiving, from the at least a portion of the plurality of electronic devices, the response data generated by the at least a portion of the plurality of electronic devices in response to the data-acquiring command comprises code to perform receiving the response data from the at least a portion of the plurality of electronic devices via a second communication link, wherein the second communication link comprises a communication link different from the first communication link.

13. The program product of claim 10, wherein the response data comprises operation data of the at least a portion of the plurality of electronic devices.

14. The program product of claim 10, wherein the executable code further comprises code to perform:

receiving, from the plurality of electronic devices, monitoring information of the plurality of electronic devices;

verifying the response data based on the monitoring information;

determining, based on the verifying, whether to continue sending the data-acquiring command to the at least a portion of the plurality of electronic devices; and in response to determining to continue to send the data-acquiring command to the at least a portion of the plurality of electronic devices, sending the data-acquiring command to the at least a portion of the plurality of electronic devices.

* * * * *